United States Patent
Dobrzhansky et al.

[11] 3,843,234
[45] Oct. 22, 1974

[54] ACOUSTIC OPTICAL ELEMENT UTILIZING UNIVALENT MERCURY HALOGENIDE CRYSTALS

[76] Inventors: Georgy Fedorovich Dobrzhansky, ulitsa Dm. Ulyanova, 3, kv. 90, Moscow; Barta Chestmir, ulitsa Narodna obrana, 21, Praha; Leonid Mikhailovich Belyaev, ulitsa M. Ulyanovoi, 3, korpus 2, kv. 5, Moscow; Iraida Mikhailovna Silvestrova, ulitsa Vavilova, 37a, kv. 62, Moscow; Jury Vladimirovich Pisarevsky, Svobodny prospekt, 4, kv. 66, Moscow, all of U.S.S.R.

[22] Filed: May 30, 1973

[21] Appl. No.: 365,178

[30] Foreign Application Priority Data
Oct. 6, 1972  U.S.S.R............................ 1833921
Oct. 6, 1972  U.S.S.R............................ 1835118

[52] U.S. Cl. ............................................. 350/161
[51] Int. Cl. ............................................. G02f 1/32
[58] Field of Search .................................. 350/161

[56] References Cited
UNITED STATES PATENTS
3,617,931  11/1971  Pinnow et al. .................. 350/161

*Primary Examiner*—Vincent P. McGraw
*Attorney, Agent, or Firm*—Holman & Stern

[57] ABSTRACT

An acousto-optical element in the form of a crystal body using a univalent mercury halogenide crystal characterized by high opto-acoustic efficiency, a broad transparent region and a low elastic wave absorption index.

4 Claims, 3 Drawing Figures

PATENTED OCT 22 1974　3,843,234

ACOUSTIC OPTICAL ELEMENT UTILIZING UNIVALENT MERCURY HALOGENIDE CRYSTALS

The present invention relates to devices used for controlling light beams such as for data processing, and in particular, to acousto-optical elements employed principally in light beam deflectors and modulators, in delay lines and correlators.

Acousto-optical elements are known in the art which are made made in the form of blocks that have been cut in a specific way and having two polished facets to transmit a light wave. An elastic wave is applied to one or two of the other facets of the element in order to produce, in the case of a light wave, a volume phase diffraction grating. A variation in the elastic wave frequency changes the spacing of the grating, while that in the amplitude of the elastic wave changes the contrast of the latter. The light wave interacts with the diffraction grating produced by the elastic wave and due to this interaction it is diffraced and modulated in phase, frequency or amplitude. The acousto-optical elements are used in a great number of various devices in order to deflect and modulate light beams as well as in devices employing a light beam for processing microwave or ultrasonic signals.

The efficiency of an acousto-optical device depends on the magnitude of the opto-acoustic interaction and on the attenuation of the elastic wave in the crystal from which the element is made.

Conventional acousto-optical device operating in the visible spectrum use acousto-optical elements made from lithium niobate, iodic acid and paratellurite.

A lithium niobate crystal has high sound conductivity with frequencies of up to several megahertz but a low opto-acoustic interaction factor.

The opto-acoustic interaction factor of an $\alpha$-iodic acid crystal is 10 times as high as that of the lithium niobate but due to the elastic wave absorption such a crystal can operate at frequencies much lower than those of a lithium niobate crystal, i.e., at about 400 MHz. However, the use of an $\alpha$-iodic acid crystal requires that special precautions be taken in order to protect its optical surfaces as the material is soluble in water.

The opto-acoustic interaction factor of a paratellurite crystal is 70 times as high as that of a lithium niobate crystal with respect to a longitudinal elastic wave, and 123 times as high with respect to a transverse elastic wave. Due to the elastic wave absorption effect, however, such a crystal can operate only at frequencies of about 200 MHz. Moreover, an acousto-optical element made from a paratellurite crystal and based on the effective opto-acoustic interaction of a light wave with a slow transverse elastic wave introduces a considerable deflected light beam distortion because of high elastic anisotropy.

An acousto-optical element made from a crystal which transmits elastic waves and from an electromagnetic radiation in the visible and infra-red regions, and which diffracts a light wave at the elastic wave is also known in the art.

Another acousto-optical element is made from a lead molybdate crystal which is at present most widely used in acousto-optics. The opto-acoustic interaction factor of such a crystal is five times as high as that of the lithium niobate. The elastic wave absorption permits the use of these crystals at frequencies of up to 500 MHz.

A major disadvantage of an acousto-optical element made of lead molybdate resides in the fact that it has a low opto-acoustic interaction factor, thus requiring that the power level of the control signals be rather high which degrades the efficiency of the system. Besides, lead molybdate suffers as it has an imperfect crystalline structure caused by difficulties in maintaining the stoichiometric relationship between the oxides of the lead and the molybdenum in its process of the monocrystal synthesis.

The principal object of the present invention is to provide an acousto-optical element made from a material possessing a high opto-acoustic interaction factor and which is capable of processing ultrasonic signals of long duration.

This object is achieved by the use of an acousto-optical element in the form of a crystal body transmitting elastic waves and electromagnetic radiation in the visible and infra-red regions and diffracting a light wave at an elastic wave, with the element, according to the invention, being of univalent mercury halogenide crystals.

It is preferable that in the acousto-optical element the univalent mercury halogenide crystal be arranged so that the elastic wave travels in the [100] and/or [010] directions while the light wave travels in the [001] direction according to the diagrams.

The invention will be better understood from the following description of embodiments thereof given by way of example with reference to the accompanying drawings, in which.

The proposed acousto-optical element using a univalent mercury halogenide crystal has an opto-acoustic interaction factor 10 times as high as those of lead molybdate and iodic acid, and 80 times as high as that of lithium niobate. Besides, it is characterized by a low sound absorption level at frequencies of up to 500 MHz.

The crystals of univalent mercury halogenides are compounds of the following types: $Hg_2F_2$; $Hg_2Cl_2$; $Hg_2Br_2$; $Hg_2I_2$; $Hg_2Cl_xF_{2-x}$; $Hg_2Cl_xBr_{2-x}$; $Hg_2Br_xI_{2-x}$; $Hg_2Cl_xI_{2-x}$; $Hg_2F_xBr_{2-x}$; $Hg_2F_xI_{2-x}$; where $x$ may vary from 0 to 2 These compounds are crystallized mainly in a tetragonal crystallographic system.

All these compounds (except $Hg_2F_2$) are insoluble in water. Calomel crystals (mercurous chloride — $Hg_2Cl_2$) will be described in greater detail. The rest of the crystals have similar properties and identical parameters as to their crystallochemical affinity.

Crystals of univalent mercury halogenides are transparent within a broad spectral region (e.g., the transparent region for mercurous chloride is from 0.38 to 34 microns and for mercury bromide, from 0.45 to 40 microns). Crystals of univalent mercury halogenides have a high index of birefringence (e.g., the refractive indices of mercurous chloride are $n_o = 1.9$ and $n_e = 2.6$, while those of mercury bromide are $n_o = 2.1$ and $n_e = 2.9$).

The term "light beam" to be used hereinafter should be understood as an electromagnetic wave whose length lies within the transparent region of an acousto-optical element using one of the above univalent mercury halogenides.

Figure 1:
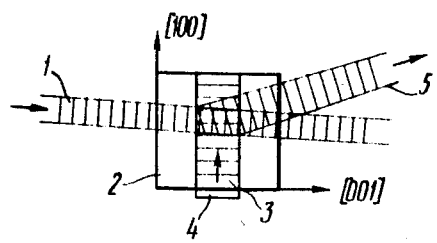
FIG. 1 is a circuit diagram of a device for scanning a light beam, which uses the proposed acousto-optical element, according to the invention.

The proposed acousto-optical element using a univalent mercury halogenide crystal diffracts a light beam having an elastic wave due to its photoelasticity effect. The above interaction makes a light beam 1 (FIG. 1), which passes through an acousto-optical element 2 of mercurous chloride ($Hg_2Cl_2$), diffract partially due to an elastic wave 3 applied to the acousto-optical element from a transducer 4. In order to convert electrical energy into the elastic wave energy the system uses a piezoelectric transducer. However, a magnetostrictive and other transducers can also be used.

A deflected light beam 5 plays a decisive role in the device being discussed as well as in all other acousto-optical devices that use the proposed acousto-optical element. Hence, the most important parameter of such devices is the relationship between the intensity of the deflected light beam and that of the incident light beam. This relationship depends on the strength of the elastic wave (control power) and on the factor $M_2$ which characterizes the opto-acoustic interaction in the crystalline medium used in the acousto-optical element.

The $M_2$ factor represents a set of the following crystal parameters $$M_2 = n^6 \cdot P^2/\sigma \cdot V^3$$

where $n$ is the refractive index,
$p$ is the photoelasticity constant,
$V$ is the velocity of sound in the crystal,
$\sigma$ is the density of the crystal.

In addition to the intensity of the deflected light beam, there is one more major parameter, viz. the maximum number of the beam's positions that can be resolved. When this parameter is taken into account, the efficiency of an acousto-optical element will be expressed as $$M_3 = n^7 \cdot P^2/\sigma \cdot V^2$$

The values of $n$, and $V$ depend on the direction and polarization of the elastic wave and the light beam, and consequently, on the orientation of the acousto-optical element.

One of the most effective crystallographic cuts of an acousto-optical element is the one at which the elastic wave will travel in the [100] or the [010] direction while the light wave will travel in the [001] direction. Moreover, if it is a longitudinal elastic wave that travels in the above said directions, the opto-acoustic interaction factor $M_2$ of an acousto-optical element using a univalent mercurous chloride crystal will be fifteen times as high as the maximum opto-acoustic interaction factor of a lead molybdate crystal.

Tabulated below are the values of $M_2$ and $M_3$ for acousto-optical elements using univalent mercury halogenides, namely mercurous chloride crystals. The table also gives the opto-acoustic interaction factors of the known acousto-optical elements, the values of these factors having been computed in relative units with respect to fused quartz for the case of longitudinal elastic beams and a light beam having a wavelength of $\lambda = 0.6328$ microns.

Table

| Material | $M_2$ | $M_3$ | Transparent region microns |
|---|---|---|---|
| 1 Quartz | 1 | 1 | 0.2 –2.8 |
| 2 Iodic acid ($\alpha$-$HIO_3$) | 55 | 32 | 0.35–1.5 |
| 3 Lead molybdate ($PlMoO_4$) | 20 | 21 | 0.38–5.5 |
| 4 Paratellurite ($TeO_2$) | 34.5 | 76 | 0.4 –5.5 |
| 5 Mercurous chloride ($Hg_2Cl_2$) | 360 | 170 | 0.38–34 |

When a transverse elastic wave polarized in the [100] direction travels in the [010] direction in an acousto-optical element made of mercurous chloride, the acousto-optical efficiency remains rather high ($M_2$ is twice as large as the maximum value of $M_2$ in lead molybdate). In this case, it should be particularly emphasized that the velocity of this wave is extremely low. For instance, in a mercurous chloride crystal $V[_{100}] [_{010}] = 0.34 \cdot 10^5$ cm/sec. This value is by one order of magnitude lower than the elastic velocity in the majority of other crystals and twice as low as in $TeO_2$ where the propagation velocity is $0.62 \cdot 10^5$ cm/sec which is considered to be the lowest for known crystals. In mercurous bromide, the value of this velocity is still lower: $V[_{100}] [_{010}] = 0.26 \cdot 10^5$ cm/sec.

Such low elastic wave propagation velocities make it possible to employ acousto-optical elements using univalent mercury halogenide crystals in passive and photoelastic delay lines as well as in pulse compression devices.

Figure 2:
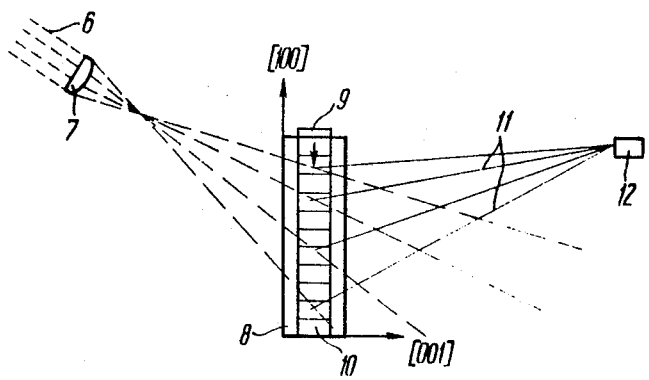
FIG. 2 is a circuit diagram of a pulse compression device using the proposed acousto-optical element, according to the invention.
Figure 3:
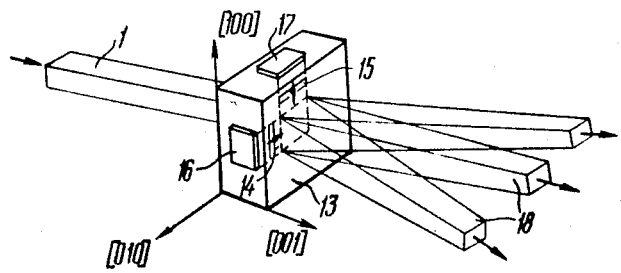
FIG. 3 is a general view of a device for scanning a light beam in two directions, using the proposed acousto-optical element, according to the invention.

FIG. 2 shows one of such devices known as the McMahon device comprising a light source (not shown) which produces a parallel light beam 6 scattered by a cylindrical lens 7. Also included in the device is an acousto-optical element 8 using a mercurous chloride crystal. The input and output (with respect to the incident light beam 6) facets of the crystal are polished and cut so that the light wave travels in the [001] direction. A piezoelectric transducer 9 is mounted on one of the facets of the element 8 which serves to feed the element 8 with an elastic wave 10 (the drawing shows the propagation direction of the wave front). The facet carrying the transducer 9 is cut so that the elastic wave travels in the [100] direction. It is also possible to mount the transducer on another facet cut in such a way that the elastic wave will travel in the [010] direction as has been described above.

A diffracted light beam 11 is received by a photoreceiver 12.

If a generator (not shown) feeds the piezoelectric transducer 9 with an electric pulse carrying linear frequency modulated components, the light beam 6 scattered by the cylindrical lens 7 will diffract at the elastic wave 10 at a definite moment (when the elastic wave pulse fills up the acousto-optical element in the direction of the wave propagation), and the light beam 11 will be gathered by the photoreceiver 12.

Thus, a pulse signal fed to the element 8 as the elastic wave 10 becomes compressed. The compression ratio of the device under consideration is equal to the product of $\Delta f \tau$, where $\Delta f$ is the band of operating frequencies of the acousto-optical element and $\tau = l/v$ is the time of delay ensured by the acousto-optical element ($l$ is the element's dimension in the direction of the elastic wave propagation).

The acousto-optical element using a mercurous chloride crystal makes it possible to considerably increase the value of $\tau$ (when a transverse elastic wave is used) and to raise the intensity of the diffracted light beam (especially when a longitudinal elastic wave is used). A similar gain will be provided by acousto-optical elements using univalent mercury halogenide crystals when they are employed in multi-channel Debye-Sears modulators in order to process microwave or acoustic signals in phased gratings.

A variation in the elastic wave frequency (FIG. 1) will cause a change in the angle between the incident and reflected light beams 1 and 5 due to the change of the spacing in the phase diffraction grating produced by the elastic wave 3 in the calomel acousto-optical element 2. The frequency of the deflected light beam 5 will also change. Thus, if the piezoelectric transducer 4 is fed with a signal whose frequency varies periodically or discretely, the light beam 5 will be scanned and frequency-modulated. In other words an acousto-optical element using a mercury halogenide crystal can be employed in light deflectors and modulators as well as in correlators and spectroanalysers for the signal being studied.

As it has been mentioned above, an acousto-optical element using a mercury halogenide crystal has two elastic wave propagation directions [100] and [010] which are identical. This particular feature can be used to scan a light beam in two directions with the help of a single acousto-optical element, e.g. in a two-coordinate deflector.

A calomel acousto-optical element 13 of such a device is fed with two elastic waves 14 and 15 which are produced by piezoelectric transducers 16 and 17 and travel in two orthogonal directions [010] and [100]. The light beam 1 in this case is incident in the [001] direction. Due to the diffraction effect, a deflected light beam 18 appears which can be shifted along two coordinates by means of varying the frequencies of the elastic waves 14 and 15.

The proposed acousto-optical elements, therefore, are characterized by high opto-acoustic efficiency (e.g., for mercurous chloride $M_2 = 360$ and $M_3 = 170$ with respect to M of fused quartz at $\lambda = 0.6328$ microns), by a broad transparent region (0.37– 35 microns for mercurous chloride) and a low elastic wave absorption index (the elastic wave absorption index for mercurous chloride is $\alpha < 0.2$ dB/musec at 200 MHz).

The proposed acousto-optical elements are also characterized by a very low elastic wave propagation velocity ($0.34 \cdot 10^5$ cm/sec for mercurous chloride), by being insoluble in water (with the exception of mercury fluoride) and can be successfully used in advanced acousto-optical devices for light beam control and for data processing.

What is claimed is:

1. An acousto-optical element in the form of a crystal body, which transmits elastic waves and electromagnetic radiation in the visible and infra-red spectral regions and diffracts a light wave at an elastic wave, with the element utilizing univalent mercury halogenide crystals.

2. An acousto-optical element as claimed in claim 1, wherein the univalent mercury halogenide crystals are oriented so that the elastic wave travels in the [100] direction and the light wave in the [001] direction.

3. An acousto-optical element as claimed in claim 1, wherein the univalent mercury halogenide crystals are oriented so that the elastic wave travels in the [010] direction, and the light wave in the [001] direction.

4. An acousto-optical element as claimed in claim 1 wherein the univalent mercury halogenide crystals are oriented so that the elastic wave travels in the [100] and [010] directions, and the light wave in the [001] direction.

* * * * *